United States Patent Office.

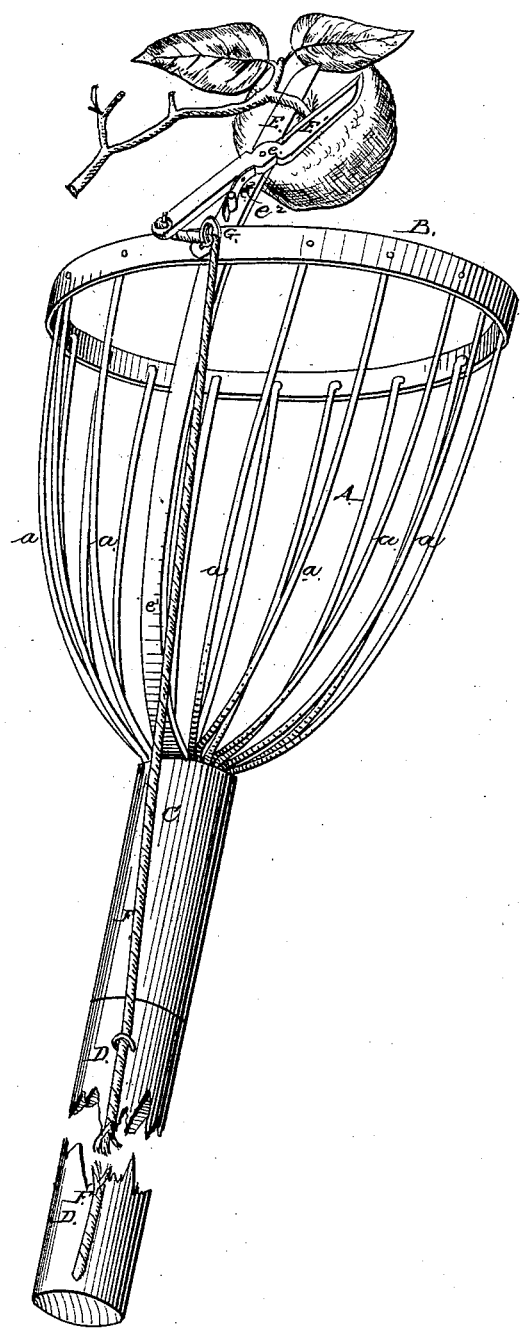

IMPROVEMENT IN FRUIT-GATHERERS.

HENRY L. SCOTT, OF PLESSIS, NEW YORK.

Letters Patent No. 60,565, dated December 18, 1866.

*The Schedule referred to in these Letters Patent and making part of the same.*

TO ALL WHOM IT MAY CONCERN:

Be it known that, HENRY L. SCOTT, of Plessis, in the county of Jefferson, and State of New York, have invented a new and useful Improvement in Fruit-Gatherers; and I do hereby declare the following to be a full, clear, and exact description of the same, sufficient to enable one skilled in the art to which the invention appertains to make use of it, reference being had to the accompanying drawings, which form a part of this specification, and in which my invention is represented by a—

Perspective view of my improved fruit-gatherer.

In the subject of this invention a basket or receptacle is attached to a rod long enough to reach the fruit, and said basket is provided with a pair of shears, which are arranged in an inclined position over the mouth of the basket, so that the fruit shall be deposited into the same when the stems are severed by the shears, which latter are operated by a cord extending down to the hand of the operator.

In the drawings, A represents a basket or receptacle, consisting of a series of wire arms, $a$, which are spread outward and connected at the top by an annular band, B, in which the upper extremities of the arms $a$ may be fastened, by riveting or otherwise. The arms $a$ converge toward each other at their lower ends, and are inserted in a wooden head enclosed within the upper portion of the socket C. The lower end of this socket, C, receives the rod D, by which the basket A may be elevated to the fruit which is to be plucked from the tree. E E' represent a pair of shears, the blade E being stationary, whilst the blade E' is movable upon the pivot $e$, and adapted to be closed by a cord, F, extending downward, so as to be convenient to the hand of the operator. The stationary blade E is formed in one piece, with flat metallic strip, $e'$, which may constitute one of the arms which compose the basket A, and which has its lower end inserted into the head C, while its upper end is riveted to the band B by the shank of the eye G, through which the cord works. It will be seen that in this fruit-gatherer there are no laterally projecting parts to interfere with the introduction of the basket A between the branches of the tree, and thus the stem of the fruit, hanging at any point, may be readily caught between the blades of the shears. The shears stand in an inclined position directly over the mouth of the basket A, so that when they are closed upon the stem of the fruit the latter is received into the basket without being bruised or broken. The movable blade E' is opened by means of a spring at $e''$, or by any other automatic contrivance, such, for instance, as an elastic cord or strap or a weight. The basket A is held aloft, and the picking operation continued until the basket is filled; it is then emptied into a suitable receptacle on the ground, and the implement is again ready for use.

I am aware that fruit-gatherers have been made by attaching a basket or receptacle to the end of a rod, and that various devices have been applied for the purpose of detaching the fruit; but I know of no previous example of a fruit-gatherer in which the shears are constructed and arranged in the manner I have described.

Having described my invention, the following is what I claim as new, and desire to secure by Letters Patent:

I claim the combination with the basket A of the shears E E', when the stationary blade E is formed and applied in conjunction with the flat strip $e'$, to form one of the ribs of the basket, and when the several parts of the instrument are combined and arranged in the manner and for the purpose herein specified.

To the above specification of my improvement in fruit-gatherers I have signed my hand, this thirty-first day of August, 1866.

HENRY L. SCOTT.

Witnesses:
SOLON C. KEMON,
JAS. L. EWIN.